US008739310B2

(12) United States Patent
Foucher et al.

(10) Patent No.: US 8,739,310 B2
(45) Date of Patent: May 27, 2014

(54) CHARACTERIZATION STRUCTURE FOR AN ATOMIC FORCE MICROSCOPE TIP

(71) Applicants: Commissariat à l' énergie atomique et aux énergies alternatives, Paris (FR); Nanotools GmbH, Munich (DE)

(72) Inventors: Johann Foucher, Voreppe (FR); Bernd Irmer, Munich (DE)

(73) Assignees: Commissariat a l'energie atomique et aux energies alternatives, Paris (FR); Nanotools GmbH, Munich (DE)

( * ) Notice: Subject to any disclaimer, the term of this patent is extended or adjusted under 35 U.S.C. 154(b) by 0 days.

(21) Appl. No.: 13/869,430

(22) Filed: Apr. 24, 2013

(65) Prior Publication Data
US 2013/0291236 A1 Oct. 31, 2013

(30) Foreign Application Priority Data

Apr. 25, 2012 (EP) .................................... 12165533

(51) Int. Cl.
*G01Q 40/00* (2010.01)
*G01Q 40/02* (2010.01)
*G01Q 70/08* (2010.01)
*G01Q 90/00* (2010.01)

(52) U.S. Cl.
CPC .............. *G01Q 40/00* (2013.01); *G01Q 40/02* (2013.01); *G01Q 70/08* (2013.01); *G01Q 90/00* (2013.01)
USPC ............................................. 850/20; 850/19

(58) Field of Classification Search
CPC ....... G01Q 40/00; G01Q 40/08; G01Q 70/00; G01Q 70/08; G01Q 70/10; G01Q 90/00
USPC ....................................................... 850/19, 20
See application file for complete search history.

(56) References Cited

U.S. PATENT DOCUMENTS

| 5,578,745 | A | * | 11/1996 | Bayer et al. | .................... | 73/1.73 |
| 6,358,860 | B1 | * | 3/2002 | Scheer et al. | ................. | 438/745 |
| 6,810,354 | B1 | * | 10/2004 | Dahlen | ........................ | 702/168 |
| 7,210,330 | B2 | * | 5/2007 | Chand et al. | ................... | 73/1.89 |

(Continued)

FOREIGN PATENT DOCUMENTS

EP 1 411 144 4/2004

OTHER PUBLICATIONS

Search Report and Search Opinion as issued for European Patent Application No. 12165533.6, dated Jun. 11, 2012.

*Primary Examiner* — David A Vanore
(74) *Attorney, Agent, or Firm* — Pillsbury Winthrop Shaw Pittman LLP (57) ABSTRACT

A structure for the characterization of a tip of an atomic force microscope, the structure being produced on a substrate and including a first support element located above the substrate; a first characterization element with a constant thickness, the first characterization element being located above the first support element and having an upper flat surface and a lower flat surface covering the upper surface of the first support element with two zones extending beyond the upper surface of the first support element, each zone having a characterization surface at one end which is capable of coming into contact with a tip to be characterized, the upper surface and the lower surface of said first characterization element being parallel to the upper surface of the substrate.

12 Claims, 7 Drawing Sheets

(56) References Cited

U.S. PATENT DOCUMENTS

| | | | |
|---|---|---|---|
| 7,352,478 B2 * | 4/2008 | Archie et al. | 356/625 |
| 8,109,135 B2 * | 2/2012 | Hug et al. | 73/105 |
| 8,443,460 B2 * | 5/2013 | Foucher et al. | 850/20 |
| 2007/0224391 A1 | 9/2007 | Krupenkin et al. | |
| 2009/0106868 A1 * | 4/2009 | Foucher et al. | 850/8 |
| 2010/0313312 A1 * | 12/2010 | Dahlen et al. | 850/20 |
| 2011/0093990 A1 * | 4/2011 | Foucher et al. | 850/33 |
| 2013/0291236 A1 * | 10/2013 | Foucher et al. | 850/56 |

* cited by examiner

CHARACTERIZATION STRUCTURE FOR AN ATOMIC FORCE MICROSCOPE TIP

CROSS REFERENCE TO RELATED APPLICATIONS

This application claims priority to European Patent Application No. 12165533.6, filed Apr. 25, 2012, the entire contents of this application are incorporated herein by reference in their entireties.

FIELD

The present invention relates to a characterization structure for an atomic force microscope tip.

BACKGROUND

Atomic force microscopy (AFM) is a scanning microscopy technique developed in the 1980s which can be used to obtain atomic scale resolution. In contrast to scanning tunneling microscopy, atomic force microscopy is not limited to the formation of images of conductive surfaces, which renders it particularly suitable for insulating materials, semiconductors, as well as samples of a biological nature. This technique has applications in many fields, such as the microelectronics industry or in biology. The essential component of a conventional atomic force microscope is a probe constituted by a lever connected to a support end, the opposite end being provided with a tip orientated towards the surface or the object to be observed. The lever is generally of the order of a few tens or hundreds of micrometers in length, and the tip has a radius of curvature of a few tens of nanometers. Such a probe, generally constituted by silicon, may be manufactured using conventional photolithographic techniques. When the tip of the probe is brought close to a surface, it is influenced by attractive or repulsive forces of a chemical, van der Waals, electrostatic and/or magnetic nature. By measuring those forces while the tip scans the surface of the object to be observed, it is possible to reconstitute an image of the surface. The forces being exerted between the tip and the object can be measured in different manners. The simplest and oldest technique (static AFM) is limited to observing, in particular by optical means, the deflection of the mounted lever supporting the tip. Such optical means typically comprise a laser diode which illuminates a reflective surface of the lever at an oblique incidence, a detector which is sensitive to the position of the reflected beam which it receives and thus is capable of detecting modifications in the orientation of the beam due to deflections of the lever. The sensitivity may be further improved by vibrating that lever in one of its fundamental modes, and by observing the variations in resonance frequency induced by the force gradients (dynamic AFM). That vibration is obtained by means of a piezoelectric tube connected to a support.

Standard tips are conventionally conical in shape, but it should be understood that this type of tip can only be used to explore reliefs without overhangs, such as hill and valley shapes.

Figure 1:
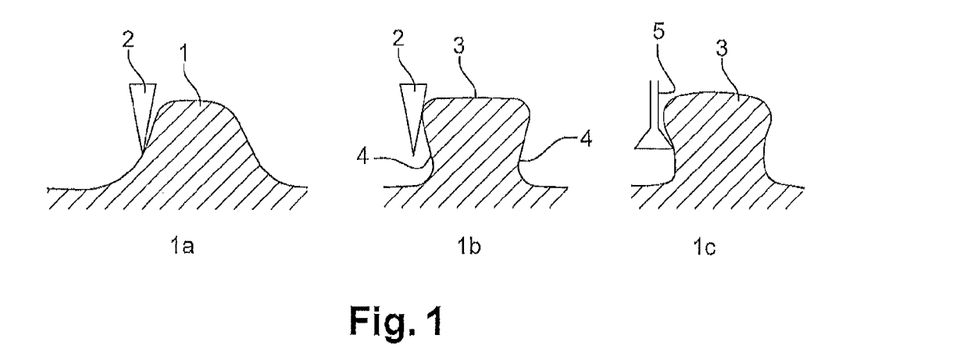
FIGS. 1a to 1c diagrammatically illustrate the principle of examining a relief with two types of tip as a function of the nature of the relief being analysed.

A known solution to that problem consists of using tungsten tips with complex shapes known as CD (critical dimension) tips that can be used to measure the dimensions of complex reliefs, in particular reliefs with overhangs. FIG. 1a shows, by way of example, the principle of examining a relief 1 without an overhang using a simple conical tip 2. FIG. 1b illustrates the difficulty arising when examining a shape 3 with cavities or overhangs using that tip 2, which cannot touch the zones 4 below the overhangs. FIG. 1c represents the principle of examining a relief having overhangs with the aid of a flared CD tip 5 with a complex shape (elephant's foot shape with a flared end so as to be able to touch the relief below the overhang). The structure of the flared tip 5 means that complex reliefs with overhangs can be explored.

For simple tips and for complex tips, a problem arises regarding integral characterization (shape and dimensions) of the tip used. That characterization step is fundamental to the accuracy and reproducibility of the measurements.

In known manner, the characterization of a CD tip with a complex shape enabling the characterization of objects in three dimensions is carried out using two distinct characterization structures formed from silicon, one enabling the overall diameter of the tip to be determined, and the other enabling its shape to be determined.

Figure 2A:
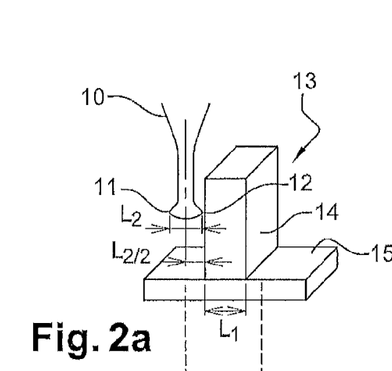
FIGS. 2a to 2d illustrate a known method for determining the overall diameter of a flared tip with a complex shape.
Figure 2B:
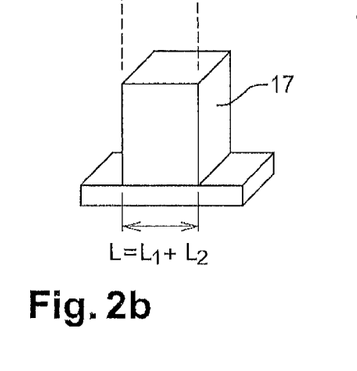
Figure 2C:
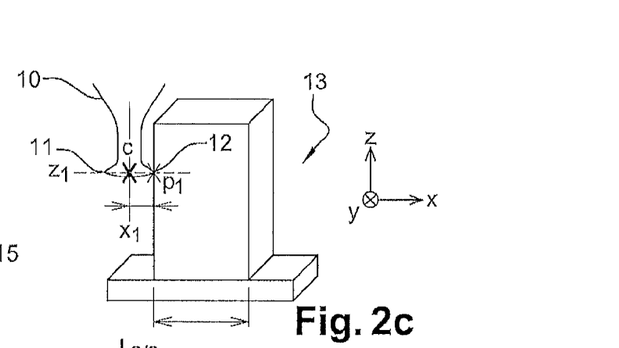
Figure 2D:
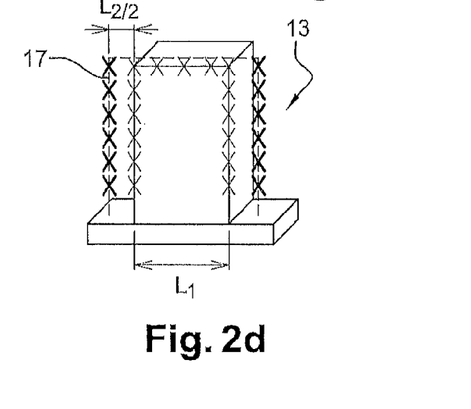

FIGS. 2a to 2d illustrate the manner by which the overall diameter of a flared tip 10 with a complex shape can be determined. This tip 10 with a complex tip comprises two projecting lateral tips 11 and 12 and has a generally circular or elliptical section. The overall diameter of the tip 10 corresponds to the width L2 separating the two lateral tips 11 and 12 projecting on either side; in other words, the overall diameter of the tip corresponds to the largest diameter of the set of horizontal sections of the tip 10. The first structure 13 enabling the diameter of the tip to be determined is constituted by a line 14 of silicon having relatively smooth vertical flanks rising above a silicon surface 15. The characterization structure 13 can also be denoted by the acronym VPS (vertical parallel structure). The width L1 of the line 14 of this VPS structure has been pre-calibrated, and so it can be used to determine the overall diameter of the tip. Knowing the dimension L1 of the line 14, if the structure 13 is scanned with the tip 10 with a complex geometry, then after the measurement, a line 17 is obtained with a virtual size L (see FIG. 2b) which is the sum of the width L1 of the line 14 and the actual width of the tip L2. This is known as "convolution" of the tip 10 with the calibration structure 13 (i.e. as soon as a probe is used to measure the dimension of any object, the dimension of the outer envelope of the probe is integrated into the measurement). The displacement contour followed by the tip 10 is thus a rectangle with a width L that is not L1 but is L1+L2. Thus, the absolute size of the tip can be deduced: L2=L−L1. If the point of contact P1 between the tip 10 and the structure 13 at a height Z1 (see FIG. 2c) is considered, the x coordinate recorded is the coordinate x1 corresponding to a shift of half a diameter, L2/2, with respect to the edge of the structure (the origin of the reference, or reference point, of the AFM measurement is in fact the centre C of a circular or elliptical section passing through the two projecting tips 11 and 12). For reasons of symmetry, the same applies on the other side of the structure at the same height Z1. Thus, by scanning the whole calibration structure 13 along the x and z axes, after the measurement is complete (see FIG. 2d), the rectangular shape of the virtual line 17 shown in FIG. 2b is obtained, corresponding to convolution of the tip 10 with the calibration structure 13 for which the final width obtained is L=L1+L2. Thus, the diameter of the tip can be obtained: L2=L−L1.

Figure 3A:
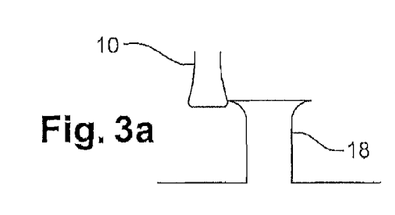
FIGS. 3a to 3c illustrate a known method for determining the shape of a flared tip with a complex shape.
Figure 3B:
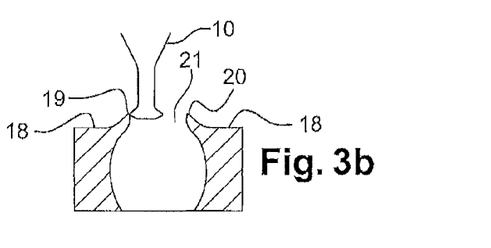
Figure 3C:
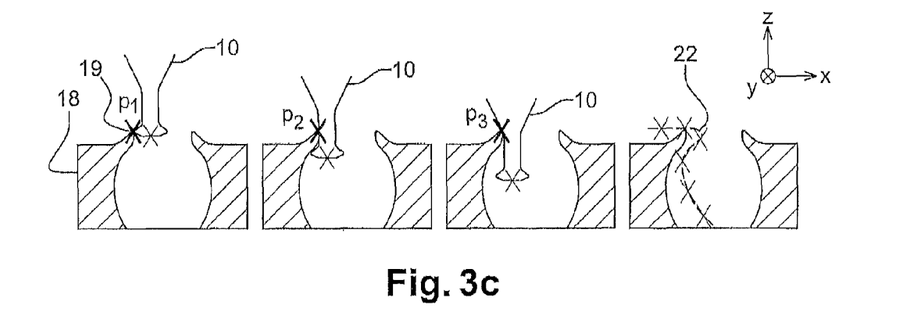

FIGS. 3a to 3c illustrate the manner of determining, imaging and characterizing the left and right hand sides of a flared tip 10 with a complex geometry and thus of gaining access to the shape of this tip in a quantitative manner using characteristic variables and employing a second characterization structure 18 as shown in FIG. 3a. In order to characterize a tip, it is very important for the various regions of the tip 10 to be in contact with the characterization structure 18. In the ideal case, this contact point will be unique for each of the sides of the tip 10. The key step thus lies in the level at which the second contact points are located, to enable integral characterization of the geometry of the tip to be carried out. In order to obtain two quasi-point contact points, the edges 19 and 20 of the characterization structure 18 are slightly thinned in order to obtain radii of curvature of less than 10 nm (see FIG. 3a).

FIG. 3b represents the respective right and left hand portions of two characterization structures 18 disposed one beside the other and forming a cavity 21. The structure 18, termed an IFSR (isolated flared silicon ridge) structure, has a vertical re-entrant profile. As indicated above, to characterize a tip, it is very important that various regions of the tip 10 are in contact with the characterization structure 18. Ideally, this contact point will be unique for each of the sides of the tip. The key step thus lies in where the two contact points between the structure and the tip occur which will allow integral characterization of the geometry of the tip. In order to obtain two quasi-point contact points, the edges 19 and 20 of the structures 18 are slightly raised and thinned in order to acquire radii of curvature of less than 10 nm (see FIG. 3b). The contour followed by the tip 10 when it is displaced means that the shape of the tip can be determined (by deconvolution with the shape of the cavity and its overhangs). The reconstitution of the shape of the tip is illustrated in FIG. 3c. A specific contact point $p_i$ (i varies from 1 to 3 in the example of FIG. 3c) between the tip and the end 19 of the characterization structure 18 will correspond to a pair of coordinates ($x_i$, $z_i$). By passing the tip 10 over the entire characterization structure 18, it is then possible, by representing all of these coordinate pairs, to determine the shape of the left hand side of the tip 10 (see curve 22). The same operation is carried out symmetrically on the right hand side of the tip 10. Thus, the shape is reconstituted by determining a succession of coordinates ($x_i$, $z_i$) for the contact points as the tip is displaced in the cavity 21, and it is the curve formed by this succession of coordinates that constitutes the data for deconvolution. The end 19 or 20 of the part ascending of the characterization structure 18 allows contact between it and the tip, and so the end 19 or 20 must as a consequence by extremely thin so that contact is as point-like as possible. Without this, good quality accuracy and reproducibility of the measurement cannot be achieved.

However, it will be noted that the characterization structures mentioned above suffer from a certain number of disadvantages when characterizing tips for atomic force microscopy, AFM. In fact, a characterization structure as illustrated in FIGS. 3a to 3c comprises projecting tips (formed by the ends 19 and 20), these tips being thinned at their ends in order to acquire radii of curvature of less than 10 nm, i.e. less than the radii of curvature of the tips to be characterized. In passing the tip to be characterized over the thinned precursors 19 and 20 in order to determine the shape of the tip to be characterized, these tips are eroded. This erosion phenomenon means that the tips 19 and 20 have to be thickened such that the radii of curvature of the thinned tips get to be more than 10 nm, i.e. larger than the radius of curvature of the tip to be characterized, and it is no longer possible to acquire sufficient measurement points that are characteristic of the diameter of the tip to be characterized. For this reason, such structures comprising eroded tips are no longer capable of properly characterizing tips for atomic force microscopy, AFM.

SUMMARY

In this context, an aspect of the present invention is to provide a structure for the characterization of an atomic force microscope tip which has a long service life and which can be used to accurately characterize any type of AFM tip (flared with a complex shape, conical or cylindrical).

To this end, an aspect of the invention proposes a characterization structure for a tip of an atomic force microscope, the structure being produced on a substrate and comprising:
  a first support element located above the substrate;
  a first characterization element with a constant thickness, the first characterization element being located above the first support element and having an upper flat surface and a lower flat surface covering the upper surface of t first support element with two zones extending beyond the upper surface of the first support element, each zone having a characterization surface at one end which is capable of coming into contact with a tip to be characterized, the upper surface and the lower surface of the first characterization element being parallel to the upper surface of the substrate.

Because of an embodiment of the invention, the characterization structure with fine tips is beneficially replaced by a structure comprising a characterization element with a constant thickness having tips (formed by the characterization surfaces) which are not fine, so that even when the tips become eroded, their thickness, constituted by the distance separating the upper surface from the lower surface of the first characterisation element, remains constant or reduces such that it is still possible to obtain sufficient characteristic points for the diameter of the tip to be characterized. If the wear on a characterization surface is uniform, then the corresponding characterization surface is substantially perpendicular to the upper surface of the substrate, and if wear is not uniform, then the characterization surface is inclined with respect to the upper (or flat) surface of the substrate. In this latter case, the extent of the characterization surface in contact with the tip is reduced, but in no case is it greater than the radius of curvature to be characterized.

Thus, characterization of the AFM tips remains optimal even if the tips (characterization surfaces) of the characterization structure are eroded.

The structure an embodiment of the invention can also allow any type of tip to be characterized: flared, cylindrical and conical tips; known characterizations in CD mode can only be used to characterize flared tips.

It could be highlighted that the T-shape structure according to an embodiment of the invention has only one support element and has two zones that can be used for characterizing a tip. Such a structure is more stable than the known lattice structure and is much stiffer: such a configuration gives more consistency to data and therefore to AFM tip characterization.

The characterization structure of an embodiment of the invention may also have one or more of the characteristics below, considered individually or in any of their technically possible combinations.

In a non-limiting embodiment, the flanks of the support element are substantially perpendicular to the substrate.

In a non-limiting embodiment, the characterization element has a constant thickness which is less than the radius of curvature of the tip to be characterized.

In a non-limiting embodiment, the thickness of the characterization element is 5 nm or less.

In a non-limiting embodiment:
  the upper surface of the characterization element and the upper surface of the substrate have a parallelism error of 5% or less;
  the lower surface of the characterization element and the upper surface of the substrate have a parallelism error of 5% or less; and the upper surface of the characterization element and the lower surface of the characterization element have a parallelism error of 5% or less.

In a non-limiting embodiment, the height separating the upper surface of the substrate and the lower surface of the first characterization element is selected such that it is greater than the height of the useful portion of the tip to be characterized.

In a non-limiting embodiment, the length of the zone is selected as a function of the re-entrant dimension of the tips to be characterized.

In a non-limiting embodiment, the two zones are of different lengths.

In a non-limiting embodiment, the characterization structure comprises:
  a second support element located above the substrate;
  a second characterization element with a constant thickness, the second characterization element being located above the second support element and having an upper flat surface and a lower flat surface covering the upper surface of the second support element with two zones extending beyond the upper surface of the second support element, each zone having a characterization surface at one end which is capable of coming into contact with a tip to be characterized, the upper surface and the lower surface of the second characterization element being parallel to the upper surface of the substrate, a zone of the first characterization element extending beyond the upper surface of the first support element facing a zone of the second characterization element extending beyond the upper surface of the second support element.

In a non-limiting embodiment, the characterization structure comprises a second support element located above the substrate, the zone of the first characterization element extending beyond the first support element being extended to the top of the second support element so as to form a characterization bridge between the first support element and the second support element.

In a non-limiting embodiment, the characterization element has a rectangular, square or circular section.

In a non-limiting embodiment, the characterization element is formed from amorphous diamond-like carbon.

In a non-limiting embodiment, the characterization element is produced in accordance with a localized amorphous diamond-like carbon growth process assisted by an electron beam.

BRIEF DESCRIPTIONS OF THE DRAWINGS

Further characteristics and benefits of the invention will become apparent from the description given below by way of non-limiting indication, made with reference to the accompanying drawings in which.

In all of the figures, common elements carry the same reference numerals.

DETAILED DESCRIPTION

FIGS. 1a to 3c have already been described above with reference to the prior art.

Figure 4:
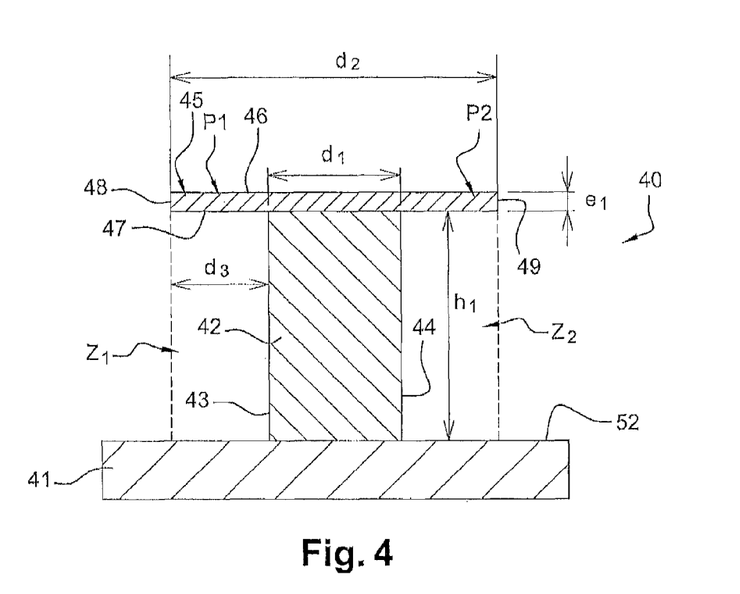
FIG. 4 illustrates a first embodiment of a structure for characterization of the tip of an atomic force microscope in accordance with the invention.

By way of non-limiting example, FIG. 4 illustrates a first embodiment of a structure 40 for the characterization of the tip for an atomic force microscope in accordance with the invention, the structure 40 being produced on a substrate 41.

The structure 40 comprises:
  a first support element 42 located above the substrate 41 (also termed the support element 42 in the remainder of the description), the support element 42 having flanks 43 and 44 which are substantially perpendicular to the substrate 41;
  a first characterization element 45 with a constant thickness e1 (also termed the characterization element 45 in the remainder of the description), the characterization element 45 being located above the support element 42 and having an upper flat surface 46 and a lower flat surface 47 covering the upper surface of the support element 42.

In addition, the characterization element 45 projects with respect to the support element 42 such that the characterization element 45 extends beyond the upper surface of the support element 42 at two zones P1 and P2. The two zones P1 and P2 have a characterization surface 48 and 49 at their respective ends, the characterization surfaces 48 and 49 being capable of coming into contact with a tip to be characterized.

Furthermore, the upper surface 46 and the lower surface 47 of the characterization element 45 are parallel to the plane (upper surface 52) of the substrate 41.

In this embodiment, the upper surface 46 of the characterization element 45 may have a parallelism error of 5% with respect to the upper surface 52 of the substrate 41 and the lower surface 47 of the characterization element 45 may have a parallelism error of 5% with respect to the upper surface 52 of the substrate 41. It should be understood that the upper surface 46 of the characterization element 45 and the lower surface 47 of the characterization element 45 are parallel to each other and may have a parallelism error of 5%.

In this non-limiting embodiment, the support element 42 with height h1 located below the characterization element 45 and above the substrate 41 is formed by a wall (or line) with a width d1 with vertical flanks. The width d1 of the support element 42 is less than the width d2 of the characterization element 45, the support element being substantially centred under the characterization element 45 such that either side of the support element 42, the characterization element 45 covers over two zones Z1 and Z2 with width d3 which are free of material (re-entrant profile of the structure 40). It should be understood that in other embodiments, the support element 42 may comprise flanks which are not substantially perpendicular to the plane 52 of the substrate 41 but are inclined with respect to that plane.

It should be noted that the characterization element 45 has a constant thickness e1 which is smaller than the radius of curvature of the tip to be characterized, and is, in an embodiment, less than 5 nm so as to be able to acquire sufficient characteristic points of the diameter of the tip. This thickness e1 is constant in any region of the characterization element 45. Such a small thickness e1 can be used to obtain two contact points which are like quasi points between the characterization surfaces 48 and 49 and the tip to be characterized. Thus, it is not necessary to thin the ends of the characterization element 45.

Thus, it is certain that these characterization surfaces 48 and 49 do not exceed 5 nm in thickness, as such a dimension is desirable to characterize the AFM tips. A greater thickness would mean that exact reconstruction of the shape of the tip could not be obtained, since it would not allow a plurality of measurement points to be taken at the end of the tip to be characterized, and thus would not enable the radius of curvature of the tip to be characterized to be determined.

The substrate 41 and the support element 42 of the structure 40 of an embodiment of the invention can be produced using conventional manufacturing steps used in the microelectronics field, for example by a succession of a lithography step then a plasma etching step. The material may be silicon, for example.

As indicated above, the thickness e1 of the characterization element 45 is very small; more particularly, the thickness e1 is less than the radii of curvature of the AFM tips, i.e. in an embodiment 5 nm or less. Further, the upper 46 and lower 47 surfaces of the characterization element 45 are parallel to the upper surface 52 of the substrate 41. Thus, in contrast to the characterization structures of the prior art, it is certain that the geometry of these AFM tips will be able to be accurately characterized. The thickness e1 of the second element 45 as well as the parallelism of the upper 46 and lower 47 surfaces with the upper surface 52 of the substrate 41 will dictate the quality of determination of the diameter of the AFM tips.

In order to obtain a thickness of 5 nm or less and a parallelism with a defect of less than 5% between the upper 46, lower 47 surfaces and, the upper surface 52 of the substrate 41, the characterization element 45 may be manufactured by an electron beam assisted localized process for growth of amorphous diamond-like carbon which is known to the skilled person as E-beam deposition, also known by the acronym EBD or focused electron beam induced deposition also known by the acronym FEBID. Such a technique is reproducible.

The material used to produce the characterization element 45 in this case is amorphous diamond-like carbon. Such a material has great hardness, thus providing the characterization structure with a long service life.

Figure 5A:
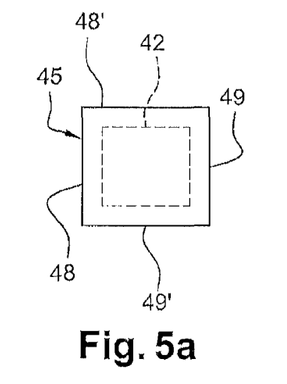
FIGS. 5a to 5c illustrate, in top view, different geometric shapes for a second element which comprises a characterization structure as illustrated in FIG. 4.
Figure 5B:
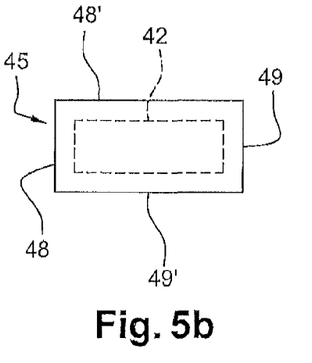
Figure 5C:
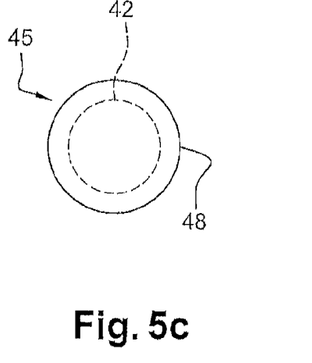

Further, because of this manufacturing method, it is possible to produce a characterization element 45 with any geometric section. FIGS. 5A, 5B and 5C illustrate various shapes for the characterization elements 45 viewed from above. By way of non-limiting example, the characterization element 45 may have a geometric section which is:

square (FIG. 5A) comprising four characterization surfaces 48, 48', 49, 49';

rectangular (FIG. 5B), comprising four characterization surfaces 48, 48', 49, 49'; and circular (FIG. 5C), comprising a single characterization surface 48; the embodiment is particularly beneficial for 3D characterization of tip shape which has a round base; processing a T-shape structure in a circle in top view makes it possible to image the 3D shape base of AFM tip.

Further, it should be noted that zones P1 and P2 of the characterization element 45 extending beyond the support element 42 are selected as a function of the re-entrant dimension of the tips to be characterized. The zones P1 and P2 will serve to determine the shape of the tip to be characterized. The contour followed by the tip to be characterized as it is displaced will then be used to determine the shape of the tip by deconvolution.

As an example:
the width d1 of the support element 42 will be of the order of 100 nm;
the width d2 of the characterization element 45 will be of the order of 140 nm.

As an example, if it is desired to characterize the shape of a flared tip which has a diameter of 50 nm and a symmetrical re-entrant profile of the order of 15 nm either side of the tip using characterization surfaces 48 and 49, a width d3 of more than 15 nm will be required (for example 20 nm, as indicated in the above example with an overall width d2 equal to 140 nm for a distance d1 equal to 100 nm).

Figure 6A:
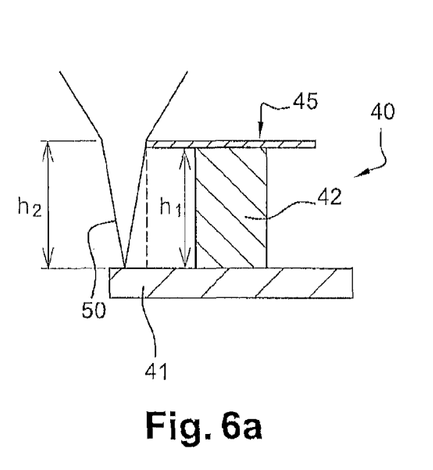
FIGS. 6a and 6b illustrate different heights for a support element which comprises a characterization structure as illustrated in FIG. 4.
Figure 6B:
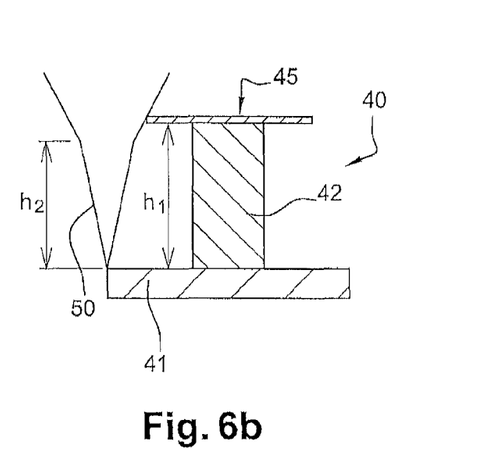

Further, the height h1 separating the upper surface of the substrate 41 from the lower surface 47 of the characterization element 45 is selected such that it is greater than the height of the useful portion of the tip to be characterized. In fact, the re-entrant zones Z1 and Z2 of the structure 40 are intended to characterize the shape of the tip and thus, inter alia, to characterize its useful length. As can be seen in FIG. 6a, if the height h1 is less than the useful length h2 of the tip (in this case the conical tip 50), it will then be impossible to monitor wear of the tip 50 in two dimensions. It will only be possible to monitor wear of the diameter but not wear in the useful length h2. In contrast, in the case of FIG. 6b, the height h1 of the support element 42 of the support 40 is greater than the useful length h2, which then renders it possible to characterize this length and thus to monitor wear of this length over time.

One has to note that other process and materials may be used to manufacture the structure according to the invention.

FIGS. 11 to 15 illustrate an example of the main procedures of a manufacturing process to obtain a structure according to the invention.

Figure 11:
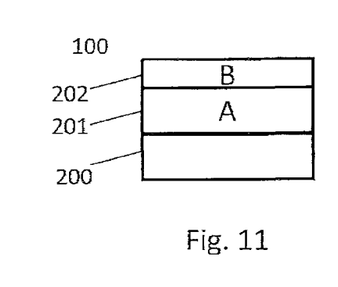
FIGS. 11-15 illustrate an example of the procedures of a manufacturing process to obtain a structure according to an embodiment of the invention.

According to a first step 100 shown in FIG. 11, a layer 201 of material A is deposited on a substrate 200 and a layer 202 of material B is deposited on the layer 201.

The material A is the one used to make the support element 42 of FIG. 4: it may be for instance materials such as Silicon or Silicon oxide.

The material B is the one used to make the characterization element 45 of FIG. 4: it may be for instance materials such as carbon, Si3N4, SiO2 or metals such as Pt, PtIr, Cr, Ti, W, Ta or NiCr.

Figure 12:
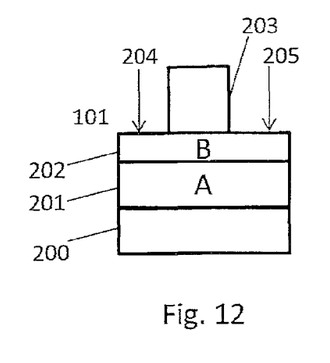

According to a second step 101 shown in FIG. 12, a step of lithography is carried out by keeping an area of resist 203 defining two zones 204 and 205 to be etched.

Figure 13:
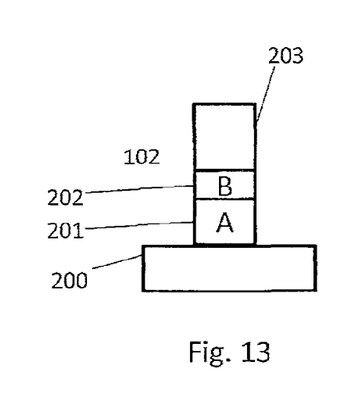

According to a third step 102 shown in FIG. 13, an anisotropic etching process is done to remove the regions of the layers 202 and 201 (respectively made of materials B and A) that are not protected by the resist 203.

Figure 14:
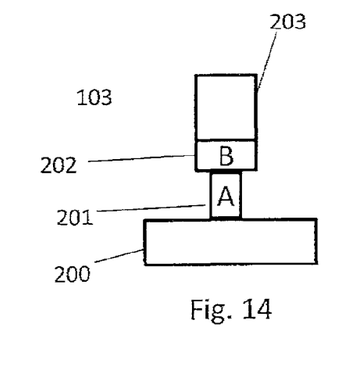

According to a fourth step 103 shown in FIG. 14, the process of manufacturing according to an embodiment of the invention comprises a step of isotropic etching allowing the removal of material A on the flanks of the layer 201 already etched in the previous step 102 by keeping the layer 202 of material B non-etched.

Figure 15:
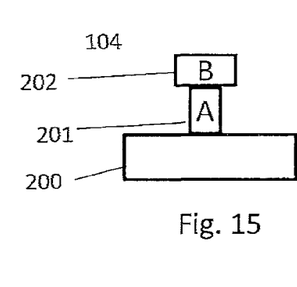

According to a fifth step 104 shown in FIG. 15, the resist area 203 is removed.

Figure 7:
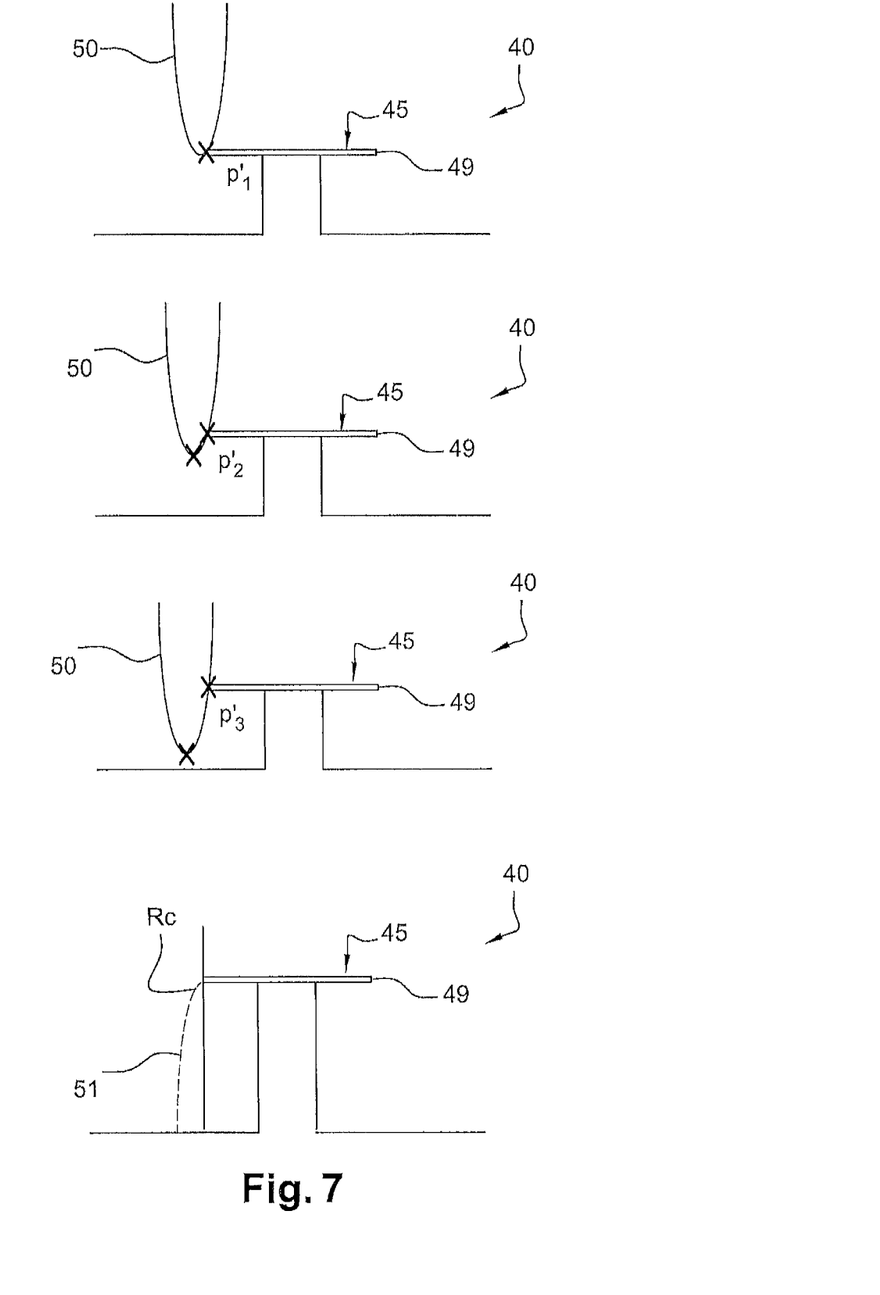
FIG. 7 illustrates the way in which the shape of a conical tip is reconstituted using a characterization structure as illustrated in FIG. 4.

FIG. 7 illustrates the way in which the shape of a conical tip 50 is reconstituted, and thus the possibility of knowing its radius of curvature Rc, using a structure 40 of an embodiment of the invention. The contact point P'i (with i varying from 1 to 3 in FIG. 7) between the conical tip 50 and the characterization surface of the characterization element 45 may be considered to be a point (this contact point is formed by the characterization surface and is 5 nm or less). The contour followed by the tip 50 as it is displaced means that the shape of the conical tip 50 can be determined. A precise contact point P'i between the conical point 50 and the characterization surface of the characterization element 45 of the characterization structure 40 will correspond to a pair of coordinates $(x_i, z_i)$. By passing the entire tip 50 over the characterization surface, by recording all of the coordinate pairs, it is then possible to obtain the shape of the right hand side of the tip 50 (see curve 51). The same operation is carried out symmetrically on the left hand side of the tip 50. The shape is reconstituted by determining a succession of coordinates $(x_i, z_i)$ for the contact points as the conical tip 50 is displaced in contact with the characterization surface. Once the curve 51 has been obtained, the radius of curvature Rc of the conical tip 50 can readily be determined.

Figure 8:
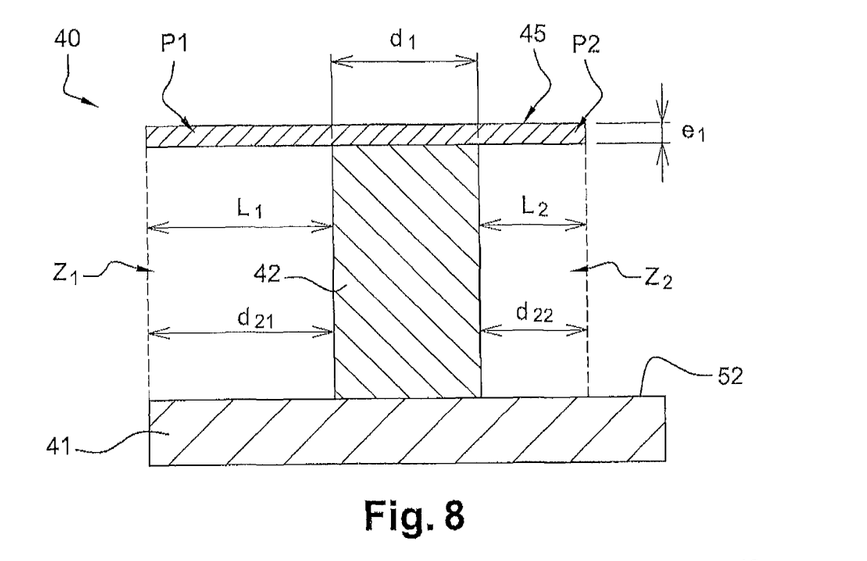
FIG. 8 illustrates a second embodiment of a structure for the characterization of a tip of an atomic force microscope in accordance with the invention.

In a second embodiment of a characterization structure of the invention illustrated in FIG. 8, the two zones P1 and P2 of the characterization element 45 extending either side of the upper surface of the support element 42 are of different lengths. In this example, the length L1 of the zone P1 is greater than the length L2 of the zone P2.

Thus, the two zones Z1 and Z2 forming the re-entrant profile of the characterization structure 40 have different widths D21 and D22. This embodiment can be used to characterize an AFM tip with an asymmetrical profile.

Such asymmetry in the characterization structure 40 can be obtained by means of a localized E-beam deposition growth process, but it could not be obtained using a plasma etching manufacturing process.

Figure 9:
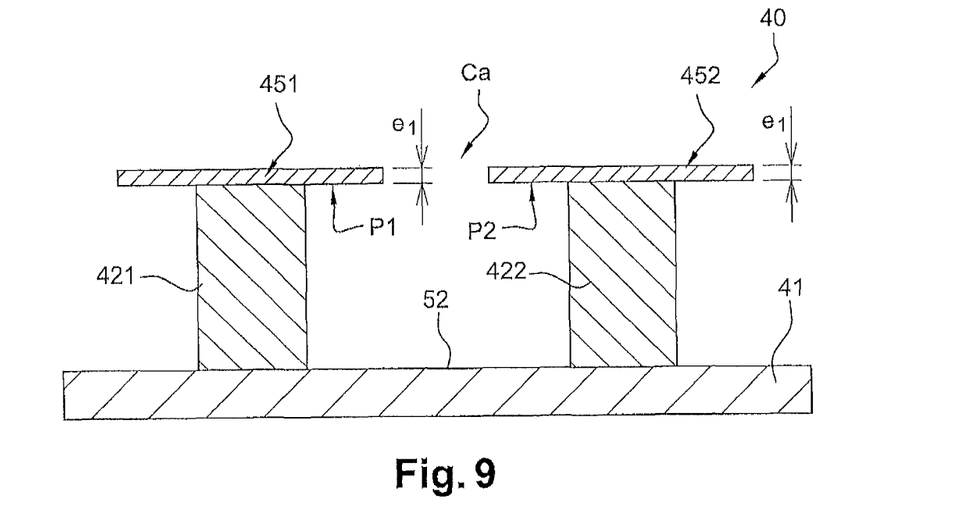
FIG. 9 illustrates a third embodiment of a structure for the characterization of the tip of an atomic force microscope in accordance with the invention.

In a third embodiment of a characterization structure of the invention illustrated in FIG. 9, the structure 40 comprises two support elements 421 and 422 as well as two characterization elements 451 and 452.

A first characterization element 451 is located above a first support element 421 and a second characterization element 452 is located above a second support element 422. In this non-limiting embodiment, a zone P1 of the first characterization element 451 projects with respect to the first support element 421 and a zone P2 of the second characterization element 452 projects with respect to the second support element 422, the two zones P1 and P2 facing each other. These elements form a cavity, ca. Thus, the contour followed by the tip to be characterized as it is displaced can be used to determine the shape of the tip (by deconvolution with the shape of the cavity, ca).

Figure 10:
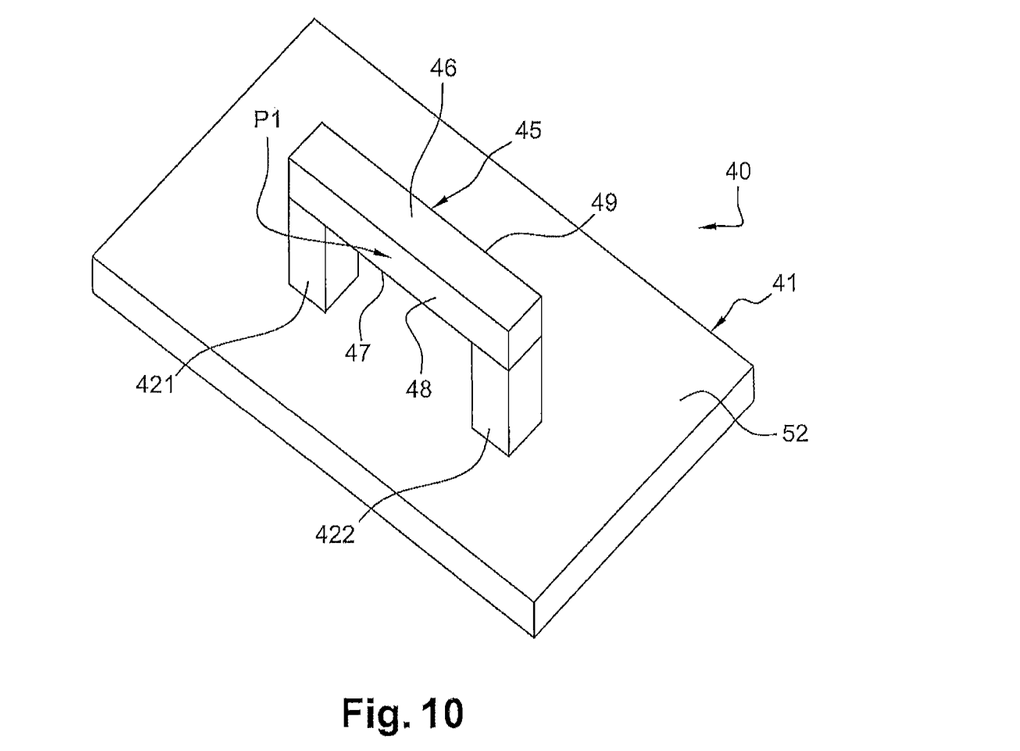
FIG. 10 illustrates a fourth embodiment of a structure for characterization of the tip of an atomic force microscope in accordance with the invention.

FIG. 10 illustrates a fourth embodiment of a characterization structure 40 in accordance with the invention.

The characterization structure 40 comprises a first support element 421 and a second support element 422 located above the substrate 41.

The characterization structure 40 also comprises a characterization element 45 with a constant thickness, the characterization element 45 being located above the first support element 421 and having a flat upper surface 46 and a flat lower surface 47 covering over the upper surface of the first upper element 421. In addition, the characterization element 45 projects with respect to the first support element 421 such that a zone P1 of the characterization element 45 extends beyond the upper surface of the first support element 421. The zone P1 extending beyond the first support element 421 carries on to extend over the second support element 422 until it covers over the upper surface of the second support element 422 so as to form a characterization bridge suspended between the first support element 421 and the second support element 422.

The zone P1 comprises two characterization surfaces 48 and 49, each being capable of being brought into contact with a tip to be characterized.

The characterization element 45 has a constant thickness e1 which is smaller than the radius of curvature of the tip to be characterized, in an embodiment 5 nm or less.

Further, the characterization element 45 may be formed from amorphous diamond-like carbon and may be produced by means of an electron beam assisted localized process for growth of amorphous diamond-like carbon.

In this embodiment, it is not necessary to be concerned about the width d3 of the two zones Z1 and Z2 which are free of material (re-entrant profile of the structure 40). In fact, if the suspended zone P1 and more particularly the characterization surfaces 48 and 49 are used to carry out the characterization of a tip with a re-entrant profile, this tip does not come into contact with any support elements.

Beneficially, it should be noted that a unique characterization structure 40 in accordance with an embodiment of the invention can be used to replace the two types of structure in current use, namely the following structures:
 VPS (vertical parallel structure), which can be used to determine the overall diameter of the tip to be characterized; and
 IFSR (isolated flared silicon ridge), which can be used to determine the shape of the tip to be characterized.

In other words, the characterization structure 40 of an embodiment of the invention can be used both to determine the overall diameter of the tip to be characterized and to determine the shape of the tip to be characterized.

In fact, since the width d2 (illustrated in FIG. 4) of the characterization element 45 has been calibrated in advance, this can be used to determine the overall diameter of the tip to be characterized.

Further, an embodiment of the invention has in particular been described for application in the semiconductors field, but it should be understood that this is not limiting and the invention may be applied to the field of insulating materials or to samples of a biological nature.

The invention claimed is:

1. A structure for the characterization of a tip of an atomic force microscope, the structure being produced on a substrate and comprising:
 a first support element located above the substrate; and
 a first characterization element with a constant thickness, said first characterization element being located above said first support element and including an upper flat surface and a lower flat surface covering the upper surface of said first support element with two zones extending beyond said upper surface of said first support element, each zone having a characterization surface at one end which is capable of coming into contact with a tip to be characterized, the upper surface and the lower surface of said first characterization element being parallel to the upper surface of said substrate.

2. The characterization structure as claimed in claim 1, wherein flanks of the first support element are substantially perpendicular to the upper surface of the substrate.

3. The characterization structure as claimed in claim 1, wherein the characterization element has a constant thickness which is less than a radius of curvature of the tip to be characterized.

4. The characterization structure as claimed in claim 1, wherein the thickness of the characterization element is 5 nm or less.

5. The characterization structure as claimed in claim 1, wherein
the upper surface of the characterization element and the upper surface of the substrate have a parallelism error of 5% or less;
the lower surface of the characterization element and the upper surface of the substrate have a parallelism error of 5% or less; and
the upper surface of the characterization element and the lower surface of the characterization element have a parallelism error of 5% or less.

6. The characterization structure as claimed in claim 1, wherein a height separating the upper surface of the substrate and the lower surface of the first characterization element is selected such that it is greater than a height of a useful portion of the tip to be characterized.

7. The characterization structure as claimed in claim 1, wherein a length of the zone is selected as a function of the re-entrant dimension of the tips to be characterized.

8. The characterization structure as claimed in claim 1, wherein the two zones are of different lengths.

9. The characterization structure as claimed in claim 1, comprising:
a second support element located above the substrate;
a second characterization element with a constant thickness, said second characterization element being located above said second support element and having an upper flat surface and a lower flat surface covering the upper surface of said second support element with two zones extending beyond said upper surface of said second support element, each zone having a characterization surface at one end which is capable of coming into contact with a tip to be characterized, the upper surface and the lower surface of said second characterization element being parallel to the upper surface of said substrate, a zone of the first characterization element extending beyond the upper surface of the first support element facing a zone of said second characterization element extending beyond the upper surface of the second support element.

10. The characterization structure as claimed in claim 1, wherein the characterization element has a section which is:
rectangular;
square; or
circular.

11. The characterization structure as claimed in claim 1, wherein the characterization element is formed from amorphous diamond-like carbon.

12. The characterization structure as claimed in claim 1, wherein the characterization element is produced in accordance with an electron beam-assisted localized amorphous diamond-like carbon growth process.

* * * * *